United States Patent [19]

Levi

[11] 4,359,261
[45] Nov. 16, 1982

[54] FIBER OPTIC SWITCHING DEVICE

[75] Inventor: Mark W. Levi, Utica, N.Y.

[73] Assignee: The United States of America as represented by the Secretary of the Air Force, Washington, D.C.

[21] Appl. No.: 176,436

[22] Filed: Aug. 8, 1980

[51] Int. Cl.³ .................. G02B 5/172; G02B 5/174
[52] U.S. Cl. .................... 350/96.14; 350/96.15
[58] Field of Search ............... 350/96.1, 96.11, 96.12, 350/96.13, 96.14, 96.15; 250/227

[56] References Cited

U.S. PATENT DOCUMENTS

| | | | |
|---|---|---|---|
| 3,320,013 | 5/1967 | Johnson | 350/96.13 |
| 3,695,745 | 10/1972 | Furukawa | 350/96.14 |
| 4,127,320 | 11/1978 | Li | 350/96.13 |
| 4,181,399 | 1/1980 | McMahon et al. | 350/96.13 X |

Primary Examiner—Marvin L. Nussbaum
Attorney, Agent, or Firm—Donald J. Singer; Willard R. Matthews

[57] ABSTRACT

An electro-optical crystal slab defining an optical waveguide modulator between two parallel boundary regions. Each boundary region has electrodes next to the channel and a doped area immediately outside the region. An electric field applied via the boundary electrodes creates a low index of refraction and transmitted light remains in the waveguide. When boundary fields are removed some light is absorbed by the doped material. Fields applied to compensating electrodes lower the index of refraction of the doped area so that the light is directed into it and absorbed. Any light passing through the absorbing material is contained in an alternate channel.

6 Claims, 2 Drawing Figures

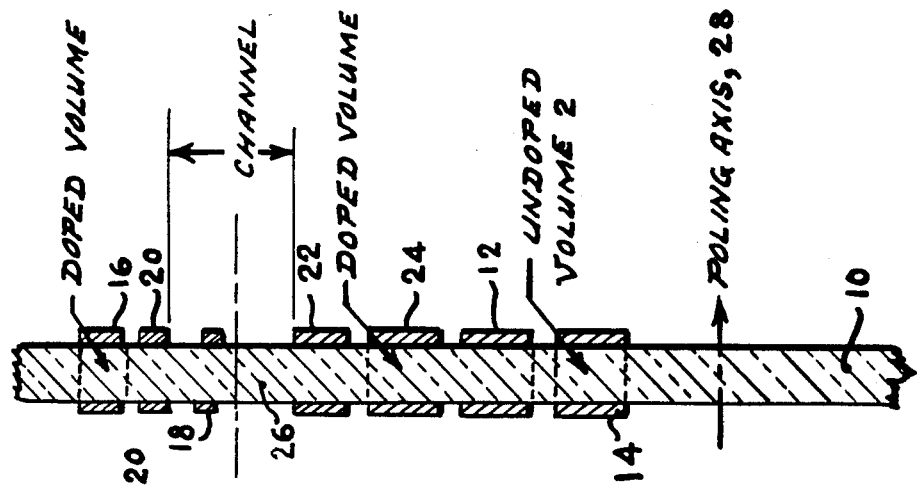
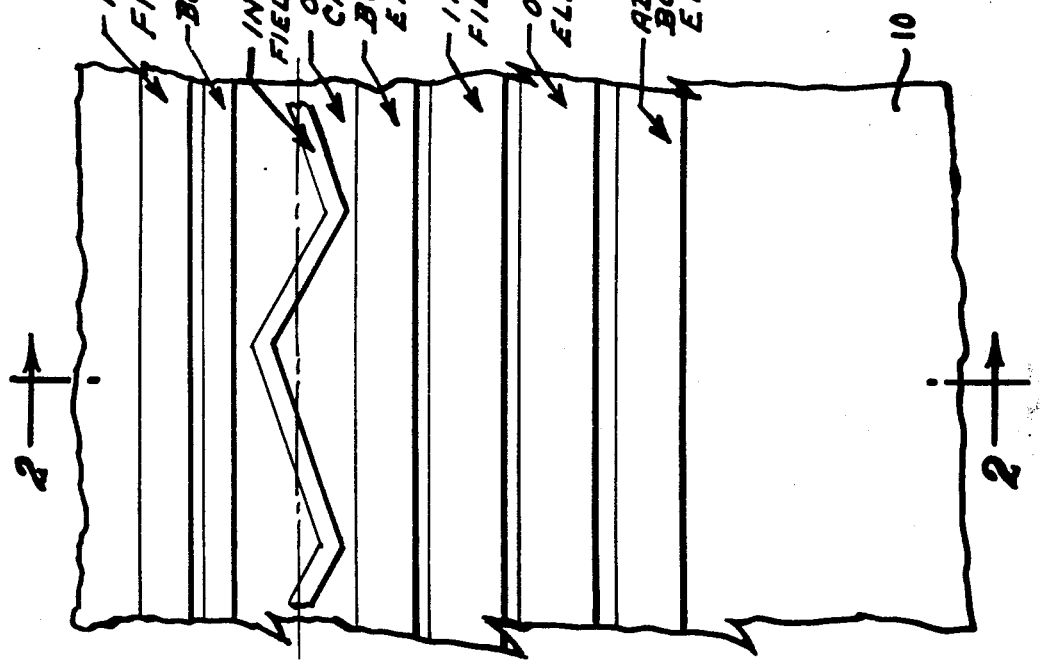

FIBER OPTIC SWITCHING DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to fiber optics and more particularly a switching device for activating and deactivating optic channels.

A great deal of interest has been shown recently in optical communications. This method has many advantages over conventional wire type communications including among others, channel isolation. This particular feature eliminates cross-talk and allows fiber optics to be bundled closely in cables or the like.

Because of the channel isolation feature, optical fibers are particularly well suited for secure communications. However, if used for secure communication, optical fiber systems must have switching systems which will fully attenuate light and not allow any leakage.

One of the concerns that arises with fiber optics is a natural loss or attenuation in the switching matrix. Light loss per switch in the system must be negligible since, with the large number of switches that light must pass through, substantial light loss in each would ernder the system ineffective. Some switches presently available use a doping process to increase the index of refraction to create the light guiding channels within the switch, but doped channels are normally lossy as well as slightly leaky. Others in which light is guided in a region bounded by a lowered index of refraction created by application of an electric field to the boundary regions, while not lossy, are still leaky particularly at discontinuities. Such leakage can enter another channel creating crosstalk.

SUMMARY OF THE INVENTION

The invention provides a channel, within a poled, transparent electro-optical crystal slab, which is nearly free of transmission loss when the guiding of an optical transmission is done by the electric-field-induced reduced refraction index in the boundries of the channel. However, the invention provides high loss in transmission when the guiding boundaries are turned off by removing their creating fields. This is caused by index-matched absorptive regions which cause large attenuation within a larger channel containing both the first channel, the first channel's boundary regions and the absorptive regions. The absorptive regions further absorb such light as may be lost by leakage from the channel when it is nearly free of transmission loss and also absorb stray light which may have escaped from other similar channels or discontinuities.

The invention is particularly adaptable to a switching matrix for use with multi-mode optical fiber transmission.

It is another object of the invention to provide a new and improved non-radiating attenuating multi-mode optical channel.

It is another object of the invention to provide a new and improved attenuating non-radiating multi-mode optical channel that provides greater attenuation than any similar known devices.

It is another object of the invention to provide a new and improved multi-mode non-radiating optical switch with a large switching ratio.

It is another object of the invention to provide a new and improved optical cross-point matrix with reduced crosstalk.

These and other advantages, features and objects of the invention will become more apparent from the following description taken in connection with the illustrative embodiment in the accompanying drawing.

DESCRIPTION OF THE DRAWINGS

FIG. 1 is a side elevation view of a section of the invention; and

FIG. 2 is a cross-sectional view taken along line 2—2 in FIG. 1.

DESCRIPTION OF THE PREFERRED EMBODIMENT

Referring now to the description of the figures, the preferred embodiment consists of the special case of the description in which the index compensating field electrode, the overcompensating field electrode and the additional boundary field electrode are combined into a single electrode either by joining them or by making them to be electrically connected.

Referring now to FIG. 1 there is shown a poled, transparent electro-optical crystal slab 10. Affixed to the slab are a plurality of electrodes, for creating electric fields. An optical channel is formed at 26 between boundary field electrodes pairs 20, 22. An in-channel reflector field electrode 18 having a general sinosoidial shape lies adjacent the channel. A pair of index-compensating electrode pairs 16, 24 are positioned distally from the boundary-field electrode pairs while a pair of overcompensating electrodes 12 extend parallel with and distally from index-compensating electrode 16. An additional boundary field electrode pair 14 extends parallel with and distally from overcompensating field electrode pair 12. FIG. 2 shows the parallel conductors and the electro-optical crystal slab in cross section as designated by the numbers 2—2. Two volumes lying between the electrodes of index compensating field electrode pairs 24 and overcompensating field electrode pairs 12 are doped with an appropriate material, such as copper ions, which causes optical absorbtion.

The direction of poling of the electro-optical crystal is shown by 28.

In this description the word parallel is taken to include "locally parallel", with a gentle curvature of all electrodes to permit guiding of light in the channel or between the proximate boundaries of the two additional-boundary electrode pairs but preventing direct transmission in a straight line within the channel or proximate boundaries of the additional-boundary electrode pairs.

Further, the description should be taken to include electrode pairs and doped regions symmetrically disposed about the channel and corresponding to 22, 24, 12 and 14 with 20 corresponding to 22, 16 corresponding to 24 and so forth.

In operation, electric fields generated by potentials applied to the index-compensating, index-overcompensating and additional-boundary electrode pairs as well as the index of refraction in the undoped region between electrodes of each additional-boundary electrode pair decrease the increased index of refraction caused by the doping and allow light which escapes from the channel to be absorbed while still trapped between the proximate boundaries of the regions defined by the two index overcompensating electrode pairs and/or the proximate boundaries of the two additional-boundary electrode pairs.

I claim:

1. A switching means for multimode optical signals wherein: within a poled, transparent electro-optical crystal slab in which an optical guiding channel can be defined between two boundary regions in each of which a change of refractive index can be caused by an electric field and wherein means is provided to cause such fields and to controllably cause said fields to be removed, the provision of a doped and consequently optically absorptive volume within said slab and adjacent to one of such boundary regions and outside of said channel with means to apply an electric field to said volume so as to substantially compensate the change in refractive index of said volume caused by said doping.

2. A switching means for multimode optical signals as defined in claim 1 wherein two such index-compensated absorptive volumes are incorporated, one adjacent to each of said boundary regions.

3. A switching means for multimode optical signals as defined in claim 2 wherein said channel is curved.

4. A switching means for multimode optical signals as defined in claim 3 wherein means are provided to apply non-uniform electric fields to said channel so as to cause optical reflection from within said channel into said absorptive volumes.

5. A switching means for multimode optical signals as defined in claim 4 wherein the portion of each such absorptive volume lying furthest from said boundary region is provided with separate means to apply an electric field and such field is applied to make such portion of said volume over-compensated in refractive index and therefore both reflective and absorptive.

6. A switching means for multimode optical signals as defined in claim 5 wherein said compensating field is further applied to an undoped volume lying adjacent to said doped volume and on the opposite side of said doped volume from said boundary region.

* * * * *